(12) United States Patent
Hickerson

(10) Patent No.: US 6,343,723 B1
(45) Date of Patent: Feb. 5, 2002

(54) MEASURING DEVICE FOR DISPENSING A PREDETERMINED QUANTITY OF LIQUID

(76) Inventor: Frederick R. Hickerson, 15 Slate Pencil Hill Rd., Newton, NJ (US) 07860

( * ) Notice: Subject to any disclaimer, the term of this patent is extended or adjusted under 35 U.S.C. 154(b) by 0 days.

(21) Appl. No.: 09/545,585

(22) Filed: Apr. 7, 2000

(51) Int. Cl.7 .................................................. G01F 11/28
(52) U.S. Cl. ....................... 222/442; 222/453; 222/476; 222/477
(58) Field of Search ................................ 222/207, 442, 222/444, 450, 453, 454, 456, 476, 477, 500, 509

(56) References Cited

U.S. PATENT DOCUMENTS

| | | | | |
|---|---|---|---|---|
| 1,279,014 A | * | 9/1918 | Schimel | |
| 2,165,570 A | * | 7/1939 | Olson et al. | 221/98 |
| 2,530,012 A | * | 11/1950 | Gronemeyer et al. | 222/356 |
| 2,585,299 A | * | 2/1952 | Cook | 222/453 |
| 2,759,641 A | * | 8/1956 | Hersh | 222/442 |
| 2,980,302 A | * | 4/1961 | Rasmussen | 222/453 |
| 3,076,581 A | * | 2/1963 | Booth | 222/453 |
| 3,163,335 A | * | 12/1964 | Chappell | 222/455 |
| 3,658,216 A | * | 4/1972 | Schwartzman | 222/453 |
| 3,666,150 A | * | 5/1972 | Liljeholm | 222/453 |
| 4,314,657 A | * | 2/1982 | Perakis et al. | 222/442 |
| 4,773,569 A | * | 9/1988 | Larsson | 222/453 |
| 5,044,527 A | * | 9/1991 | Hickerson | 222/451 |
| 5,186,367 A | * | 2/1993 | Hickerson | 222/207 |
| 5,407,104 A | * | 4/1995 | Santaguiliana | 222/425 |

* cited by examiner

Primary Examiner—Joseph A. Kaufman
(74) Attorney, Agent, or Firm—Duane Morris & Heckscher

(57) ABSTRACT

A device for assisting in the dispensing of liquid comprising a shaft having a substantially hollow passage therein, a first cap disposed on a first end of the shaft, a second cap disposed on a second end of the shaft, the second cap having an opening therein which is substantially aligned with the hollow passage, and, a spider guide disposed between the second cap and the shaft, wherein the shaft has at least one hole therein disposed at a position closer to the first end of the shaft than the second end of the shaft. The device is preferably inserted into a container which holds liquid to be dispensed. The device provide a venting and dispensing controlling system whereby defined quantities of liquid can be dispensed from the container quickly and efficiently.

18 Claims, 8 Drawing Sheets

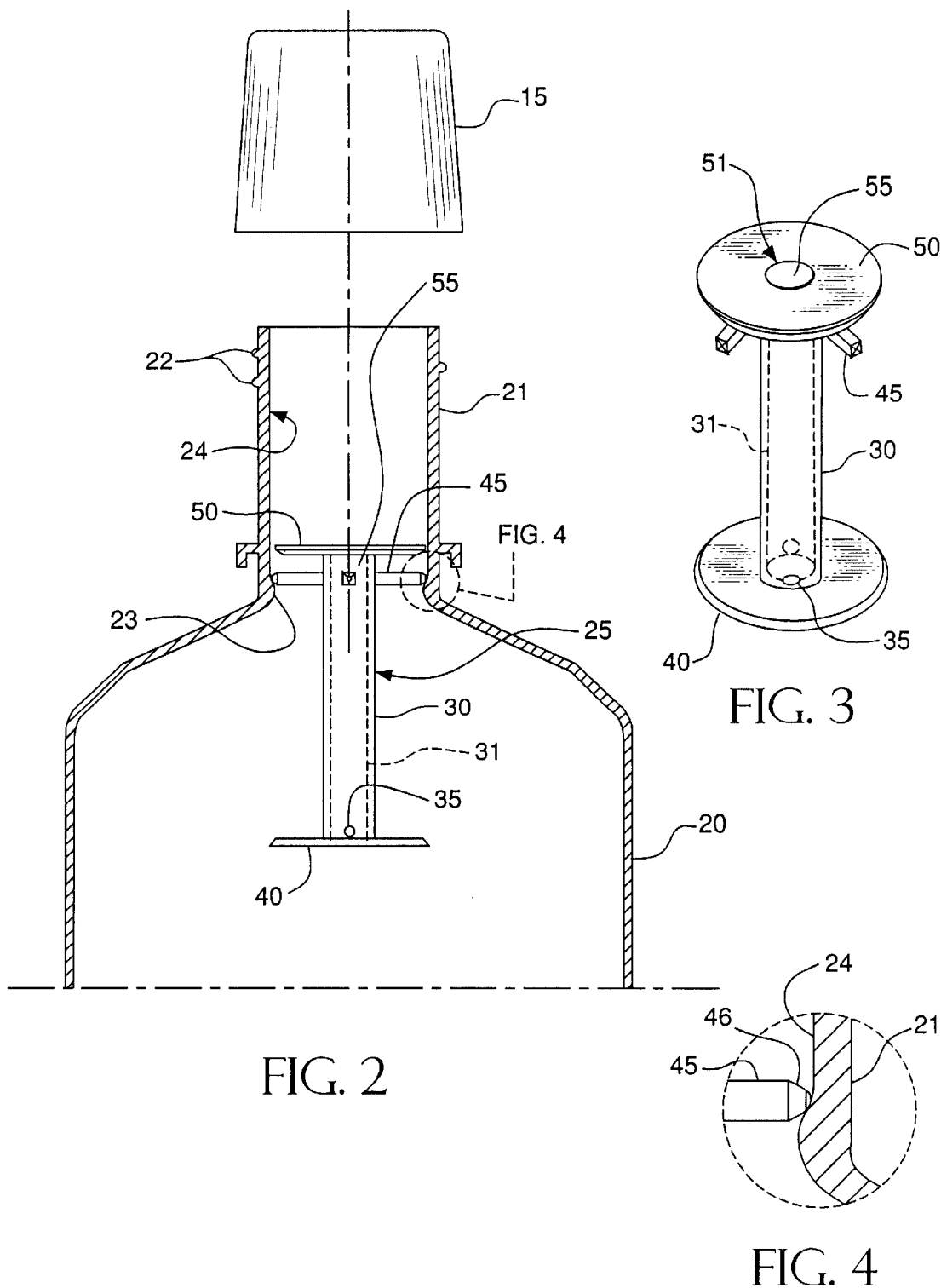

MEASURING DEVICE FOR DISPENSING A PREDETERMINED QUANTITY OF LIQUID

FIELD OF THE INVENTION

The present invention relates to devices for dispensing liquid, and in particular, devices for dispensing predetermined quantities of liquid from a container.

DESCRIPTION OF THE RELATED ART

Products such as liquid detergents, soaps, bleaches, and fabric softeners are currently being sold in containers which require the user to determine the amount of liquid needed for a specific end use of the product. Some of these containers have caps which may also serve as measuring cups to assist the user in pouring out a desired quantity of the product. Hopefully, the user keeps the measuring cup close at hand after the product has been opened, such as when detergents are used in laundry rooms.

Instructions on the containers provide the user with helpful information in determining the correct, or optimum amount of liquid bleach, for example, to use for the intended size of the laundry load, types of clothes being cleaned, and particular fabrics. Other liquids, such as mouthwash and medicinal liquids, are also preferably dispensed with precision and accuracy.

It has been learned, however, in a survey of users of such liquids, that most people merely pour out an estimated amount of the liquid based primarily on their own judgment and experience, or lack thereof. Very few users bother to take the time to measure the precise quantity, either with or without the measuring cap, because doing so requires extra time and two hands. As a result, the quantity of product varies greatly from individual to individual, even though a precise dose is required. This happens in spite of the known fact that using too much or too little of the product will affect the success of the job, whether it is cleaning, freshening breath, dispensing cough syrup, or whatever. Obviously, too much product is wasteful and expensive, and in the case of medicines, may be dangerous.

It is generally recognized by bottle and cap manufacturers that a container dispensing system which is capable of providing an accurate measure quantity of product is highly desirable.

U.S. Pat. No. 5,044,527 to the present inventor discloses a liquid dispensing system for dispensing a predetermined quantity of liquid. The system includes a container 10 with a restricted throat 29. The container 10 has disposed therein a valve spool 17 for controlling the quantity of liquid which flows from the container. The valve spool 17 includes an elongated stem 19, a valve means 25, a piston 21, and a spider guide 23. The piston 21 includes a vent 27 which allows air to flow back into the container 10 to assist in the dispensing process. The valve spool 17 fits into the restricted throat 29 of the container 10, as shown in FIG. 2 of the patent. As shown in FIGS. 6 and 7 of the patent, when the container 10 is inverted, liquid inside the container fills a top chamber 13 of the container until valve means 25 (of the valve spool 17) seals the top chamber from the remainder of the container (FIG. 7). Thus, liquid present in the container can be dispensed in predetermined amounts.

A problem associated with the above dispensing system is that it often times does not dispense liquid evenly due to inefficiencies of the venting system (e.g., vent 27 on the valve spool 17). For example, the liquid will sometimes be dispensed in "clumps" or uneven amounts due to the irregular airflow through the vent 27 and into the container 10. Additionally, the vent 27 often causes inaccuracies between pours based on the orientation and speed of the pour, and also allows some fluid to pass out through the vent (thereby decreasing the accuracy of the amount of liquid poured).

Thus, there is currently a need for an improved venting system for liquid dispensing systems which dispenses predetermined quantities of liquid in precise amounts.

SUMMARY OF THE INVENTION

The present invention is a device for assisting in the dispensing of liquid comprising a shaft having a substantially hollow passage therein, a first cap disposed on a first end of the shaft, a second cap disposed on a second end of the shaft, said second cap having an opening therein which is substantially aligned with the hollow passage, and, a spider guide disposed between the second cap and the shaft, wherein the shaft has at least one hole therein disposed at a position closer to the first end of the shaft than the second end of the shaft.

The above and other advantages and features of the present invention will be better understood from the following detailed description of the preferred embodiments of the invention which is provided in connection with the accompanying drawings.

BRIEF DESCRIPTION OF THE DRAWINGS

FIG. 2 is partial cross-section view of the liquid dispensing system of FIG. 1.

FIG. 3 is an isometric view of a valve device according to a first exemplary embodiment of the present invention.

FIG. 4 is an enlarged view of a container throat shown in FIG. 2.

DETAILED DESCRIPTION

Figure 1:
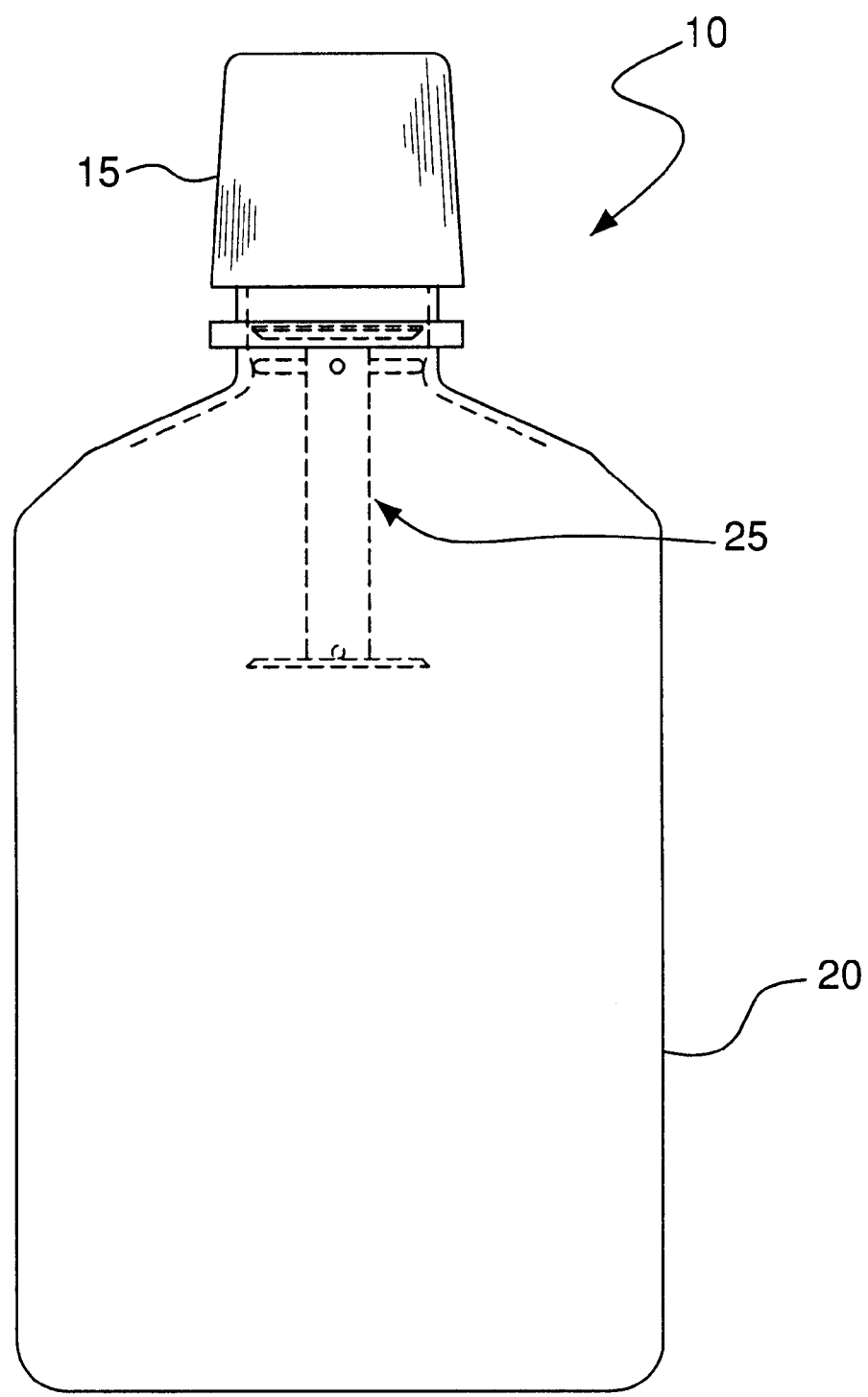
FIG. 1 is side elevation view of a liquid dispensing system according to a first exemplary embodiment of the present invention.

Referring to FIG. 1, there is shown a liquid dispensing system 10 according to a first exemplary embodiment of the present invention. The system 10 includes a container 20 with a cap 15, and a valve device 25 disposed inside the container. The container 20 includes a neck 21 with an inner surface 24 and an outer threaded surface 22.

Figure 5:
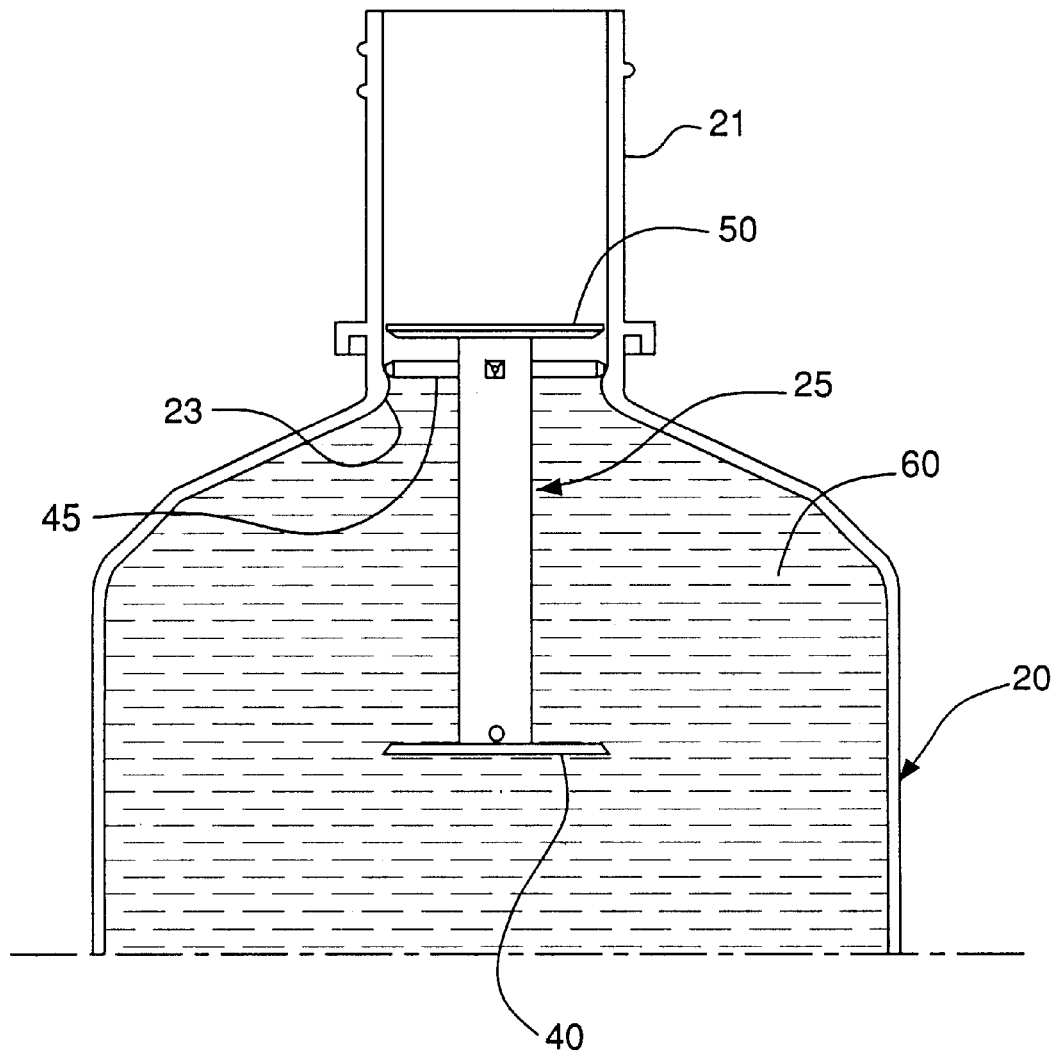
FIG. 5 is side elevation view of the liquid dispensing system of FIG. 1 with liquid therein.

As shown more particularly in FIG. 2–4, the valve device 25 includes several portions. The bulk of the valve device 25 is a shaft 30 which includes a hollow passage 31 on the interior thereof. A first valve cap 40 is coupled to a first end of the shaft 30, and a second valve cap 50 is coupled to a second end of the shaft. The first valve cap 40 is preferably made of a flexible material (e.g., flexible plastic) so that the valve device may be easily inserted into the container 20, as explained below. In order to provide flexibility, the first valve cap 40 is preferably made of a very thin plastic member (e.g., 0.025 inches thick or less). The first valve cap 40 also preferably has a diameter at least twice the diameter of the shaft 30. This feature allows the valve device 25 to be utilized with containers (e.g. container 20) of different neck (e.g., neck 21) sizes while still allowing significant liquid flow. Additionally, the diameter of the first valve cap 40 is preferably made wider than the diameter of the container throat 23, so that once the valve device 25 has been inserted in the container 20, it cannot be removed without applying significant force to the valve device in an upwards direction (i.e., away from the container 20). The second valve cap 50 preferably includes a central hole 51 which is substantially aligned with the hollow passage 31 in the shaft 30. The diameter of the second valve cap 50 is preferably less than the diameter of the container neck 21, so that the valve device 25 may move within the container neck. The valve device 25 also includes a spider guide 45 which is preferably approximately the same diameter as the container throat 23, so that an outer surface 46 of the spider guide rests on the container throat (see FIG. 4) when the container 20 is in its fully upright position (as shown in FIG. 2). The spider guide 45 is preferably dimensioned so as to center the valve device 25 within the container neck 21. The spider guide 45 preferably comprises an X-shaped member which extends from shaft 30, however, the spider guide may take any suitable shape known to those skilled in the art. FIG. 5 shows the liquid dispensing system according to the first exemplary embodiment of the present invention, where the container 20 is filled with liquid 60.

The valve device 25 is preferably inserted in the container 20 by placing the valve device in the container neck 21 and applying a downward force on the valve device so that the first valve cap 40 is forced through the throat 23 of the container. Then, the valve device 25 falls down in the container neck 21 until the spider guide 45 rests on the throat 23 of the container 20.

Figure 6:
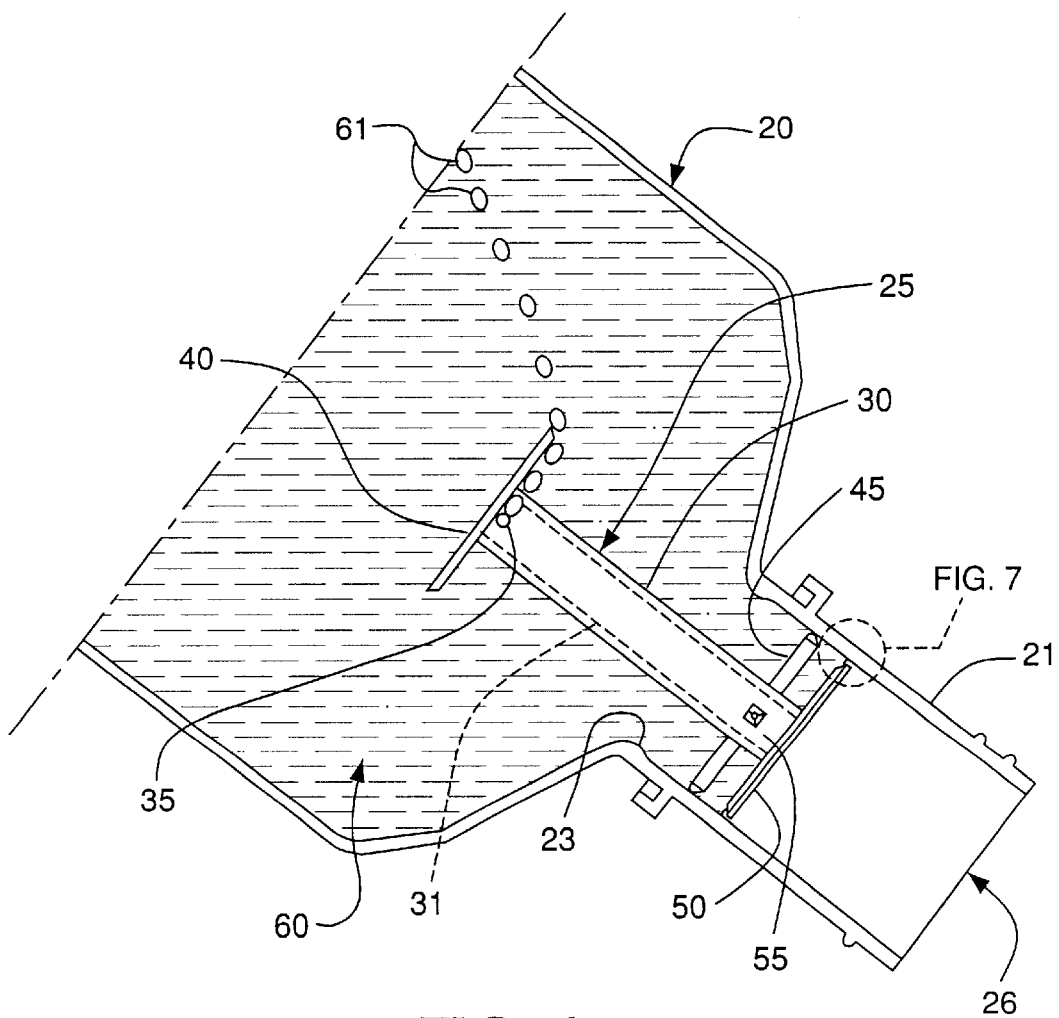
FIG. 6 is side elevation view of the liquid dispensing system of FIG. 1 in a partially inverted position.
Figure 7:
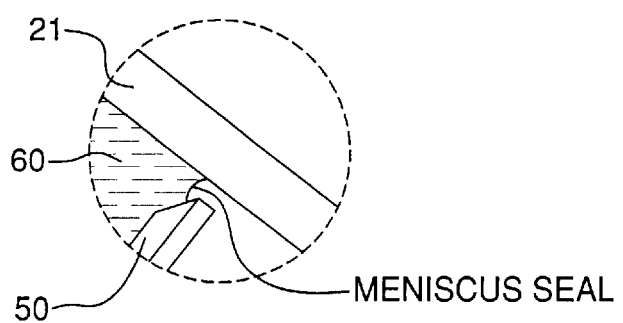
FIG. 7 is an enlarged view of a container neck shown in FIG. 6.
Figure 8:
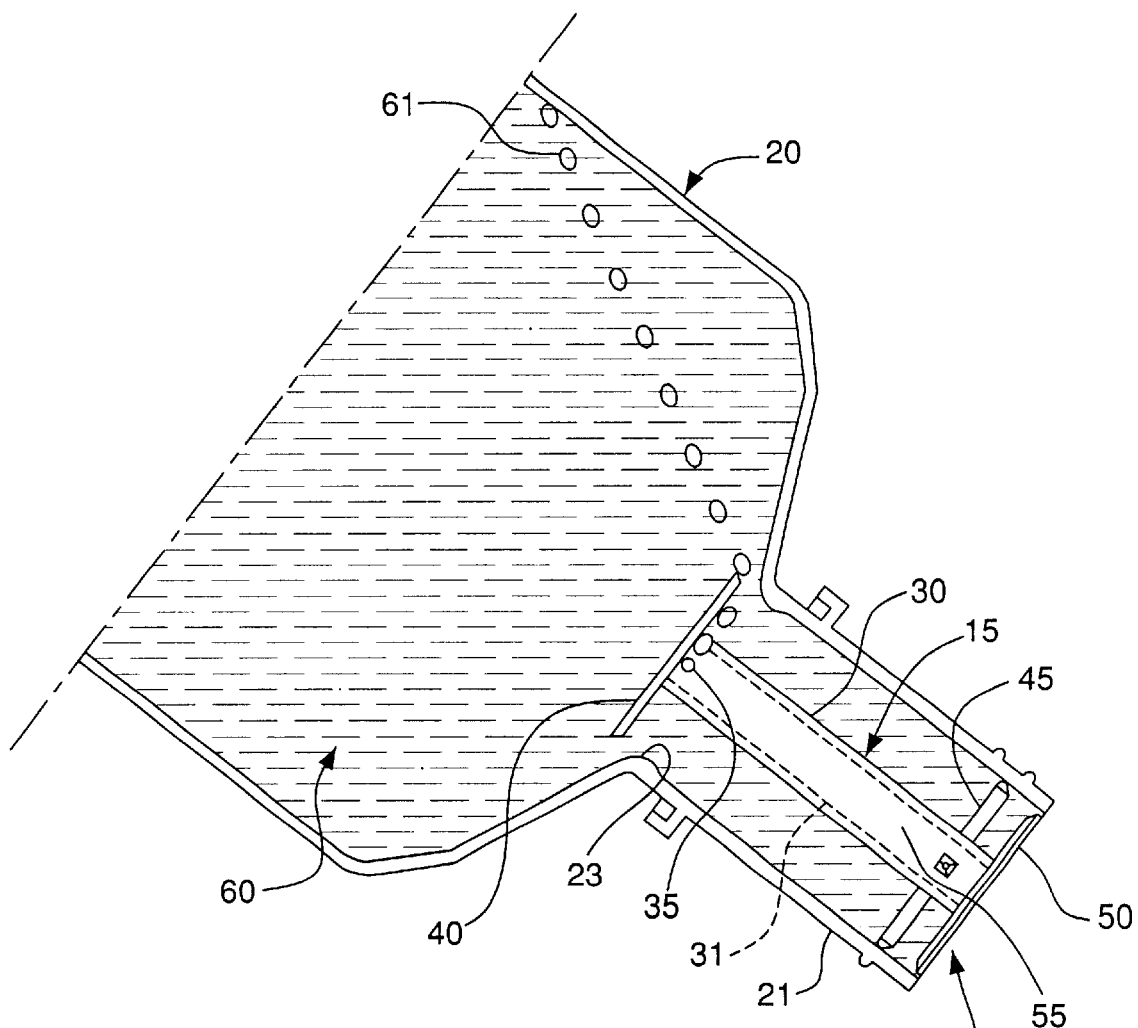
FIG. 8 is side elevation view of the liquid dispensing system of FIG. 1 in more fully inverted position.
Figure 9:
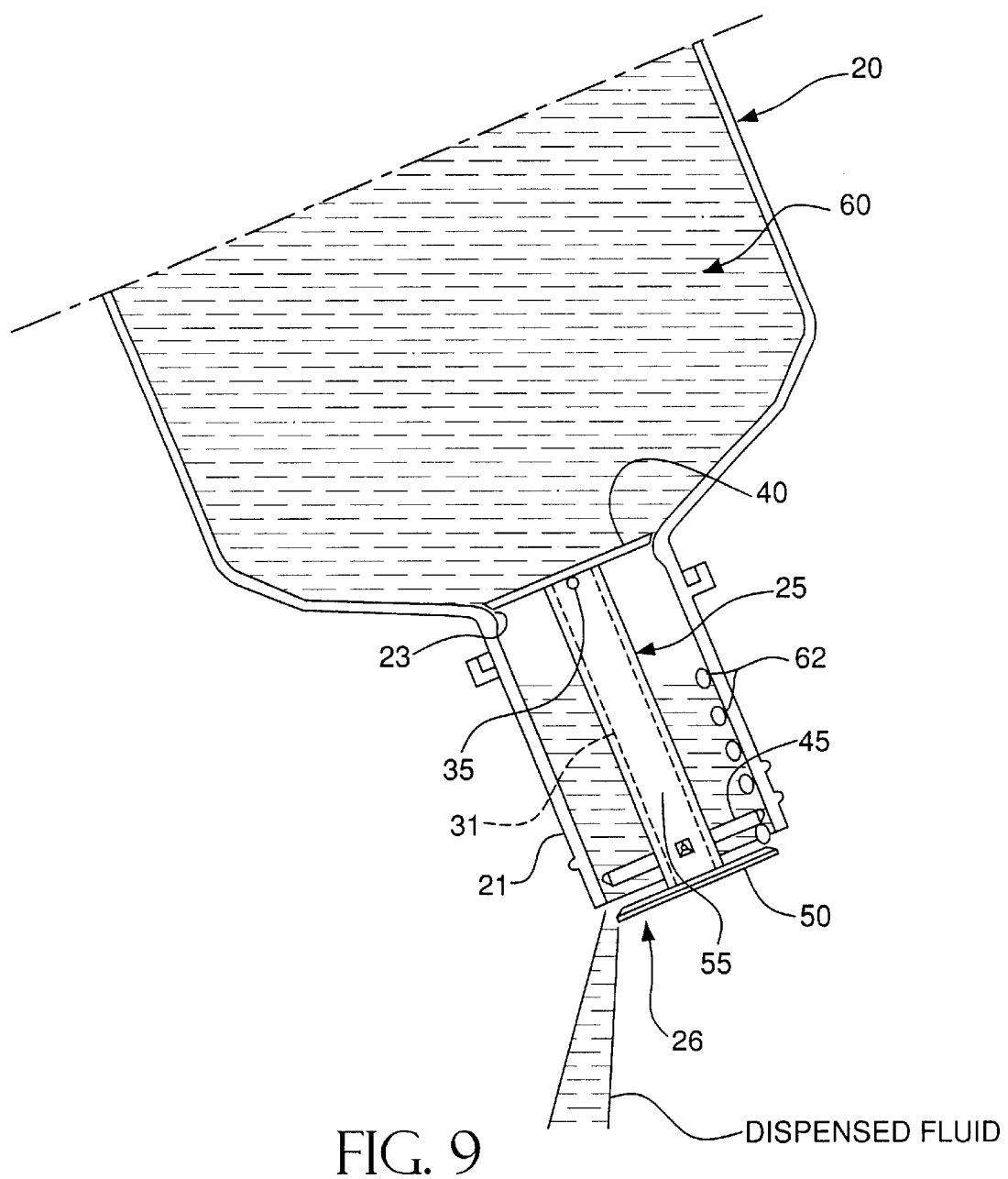
FIG. 9 is side elevation view of the liquid dispensing system of FIG. 1 in a completely inverted position.

In operation, the liquid dispensing system 10 provides for the dispensing of controlled amounts of liquid 60. The dispensing process is begun by removing the cap 15 from the container 20 and inverting the container as shown in FIG. 6. As the container is inverted, the valve device 25 begins to move forward in the container neck 21, and liquid in the container 20 begins to flow into the container neck towards a container dispensing opening 26. Additionally, air bubbles 61 form in the liquid 60 due to the flow of air through the valve device 25. As shown in FIG. 7, the diameter of the second valve cap 50 and the meniscus seal of the liquid 60 prevents the liquid from moving around the valve device 25 as it flows into the container neck 23. It should be noted that as the container 20 is inverted, air flows into the valve device 25 through inlet vent hole 55, and out into the liquid (as bubbles 61) through one or more outlet vent holes 35 (disposed on either side of the shaft 30). As the container 20 becomes more and more inverted, the valve device 25 continues to move forward in the container neck 21, as does the liquid 60 (see FIG. 8). As soon as the second valve cap 50 passes across the container dispensing opening 26, liquid 60 begins to flow from the container. At approximately the same time that valve cap 50 is passing across the container dispensing opening 26, the first valve cap 40 becomes seated in the container throat 23, thereby preventing liquid 60 in the container 20 from continuing to flow into the container neck 21 (see FIG. 9). The liquid trapped in the container neck 21 is thus dispensed through container dispensing opening 26 in a predetermined amount. As shown in FIG. 9, liquid is dispensed from a gap between the container dispensing opening 26 and the second valve cap 50. During this process, air flows into the container neck 21 at an upper side thereof (causing bubbles 62 to form), while fluid is dispensed from a lower side.

The above components are preferably manufactured in accordance with the following equations. The first valve cap 40 preferably has a diameter $d_1$ where $d_1 = d_{throat} + 0.010$ inches, where $d_{throat}$ is the inner diameter of the container neck (e.g. neck 21). The second valve cap 50 preferably has a diameter $d_2$ where $d_2 = d_{neck} - 0.016$ inches, where $d_{neck}$ is the inner diameter of the container neck (e.g. neck 21). The spider guide 45 preferably has a diameter $d_3$ where $d_3 = d_{neck} - 0.010$ inches, where $d_{neck}$ is the inner diameter of the container neck (e.g. neck 21). A separation length between the spider guide 45 and the second valve cap 50 is preferably in a range of 0.150 and 0.180 inches, but may be selected as any suitable length by those skilled in the art. The selection of the size of inlet vent hole 55, outlet vent hole 35, and hollow passage 31 are preferably based on the pour volume (amount) desired for a specific container. In particular, if a smaller volume of liquid is required to be dispensed, the vent holes 35, 55 and hollow passage 31 (and shaft 30 if required) are made larger in diameter, and if a larger volume of liquid is needed, the vent hole and hollow passage (and shaft 30 if required) are made smaller in diameter. Alternatively, additional vent holes 35, 55 could be added to the shaft 30 to increase the volume of fluid dispensed.

Figure 10:
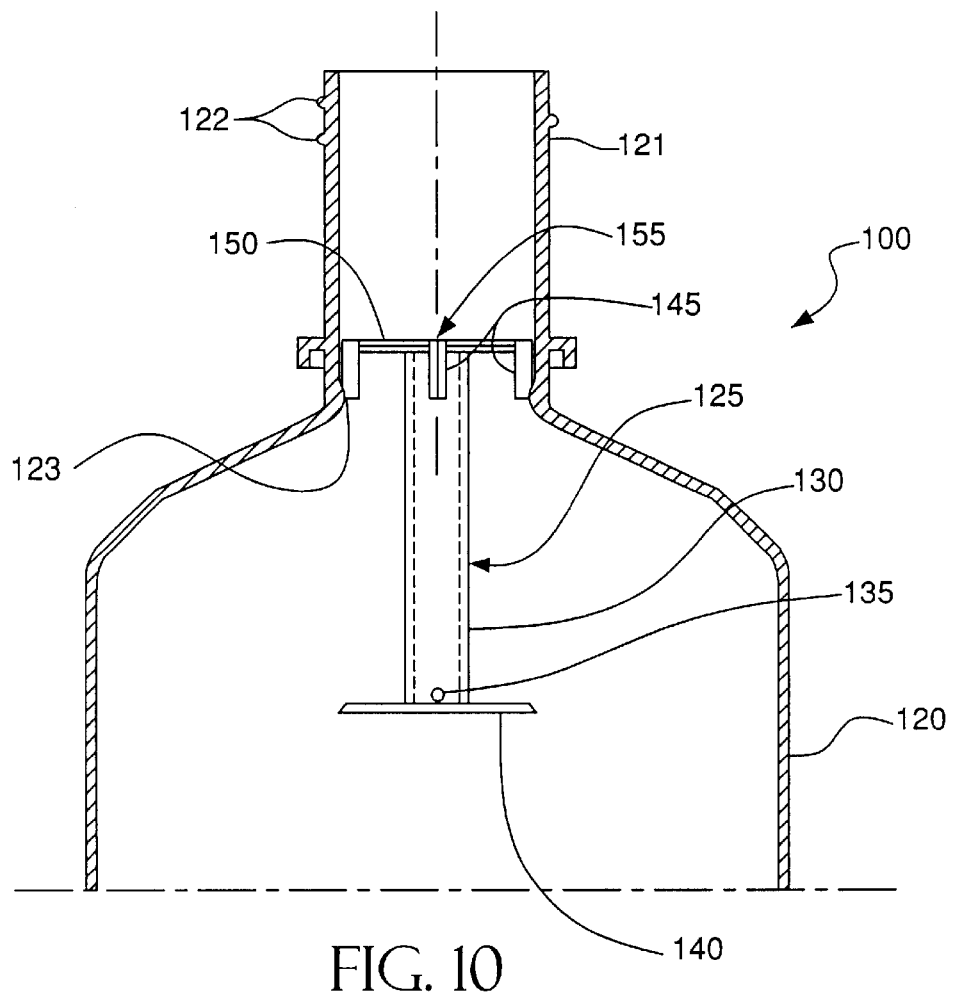
FIG. 10 is partial cross-section view of a liquid dispensing system according to a second exemplary embodiment of the present invention.
Figure 11:
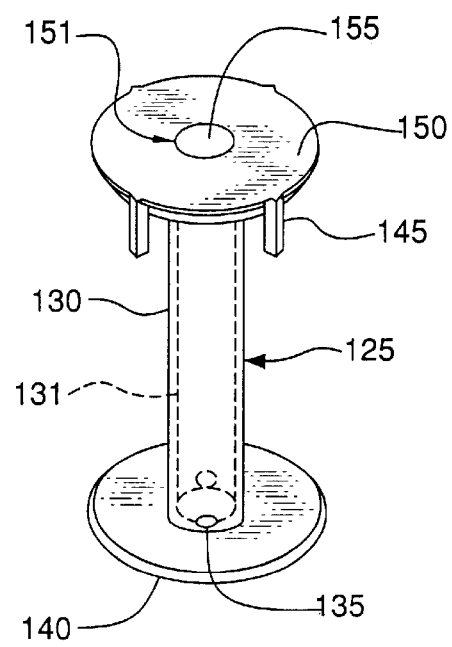
FIG. 11 is an isometric view of a valve device according to a second exemplary embodiment of the present invention.

FIGS. 10 and 11 show a liquid dispensing system 100 according to a second exemplary embodiment of the present invention. The system 100 is substantially similar to the system 10 shown in FIGS. 1–3, except that a piston guide 145 replaces the spider guide 45.

The system 100 includes a container 120 with a valve device 125 disposed inside the container. The valve device 125 includes a shaft 130 which includes a hollow passage 131 on the interior thereof. A first valve cap 140 is coupled to a first end of the shaft 130, and a second valve cap 150 is coupled to a second end of the shaft. The first valve cap 140 is preferably made of a flexible material (e.g., flexible plastic) so that the valve device may be easily inserted into the container 120. The first valve cap 140 also preferably has a diameter at least twice the diameter of the shaft 130. This feature allows the valve device 125 to be utilized with containers (e.g. container 120) of different neck (e.g., neck 121) sizes while still allowing significant liquid flow. Additionally, the diameter of the first valve cap 140 is preferably made wider than the diameter of the container throat 123, so that once the valve device 125 has been inserted in the container 120, it cannot be removed without applying significant force to the valve device in an upwards direction. The second valve cap 150 preferably includes a central hole 151 which is substantially aligned with the hollow passage 131 in the shaft 130. The diameter of the second valve cap 150 is preferably less than the diameter of the container neck 121, so that the valve device 125 may move within the container neck. The valve device 125 also includes a piston guide 145 which is preferably formed as an integral part of the second valve cap 150. The piston guide 143 preferably comprises four guide members disposed at various positions around the periphery of the first valve cap 150 and extending therefrom, as shown in FIG. 11, or may comprise any number of such guide members (or any other equivalent member) as are desired. The guide members are preferably positioned on the second valve cap 150 so that they rest on the container throat 123 (see FIG. 10) when the container 120 is in its fully upright position. One of the benefits of the system 100 is that the a separate spider guide is not needed, thereby making construction of the valve device 125 simpler (and accordingly easier to manufacture through extrusion processes) than the valve device 25.

Figure 12:
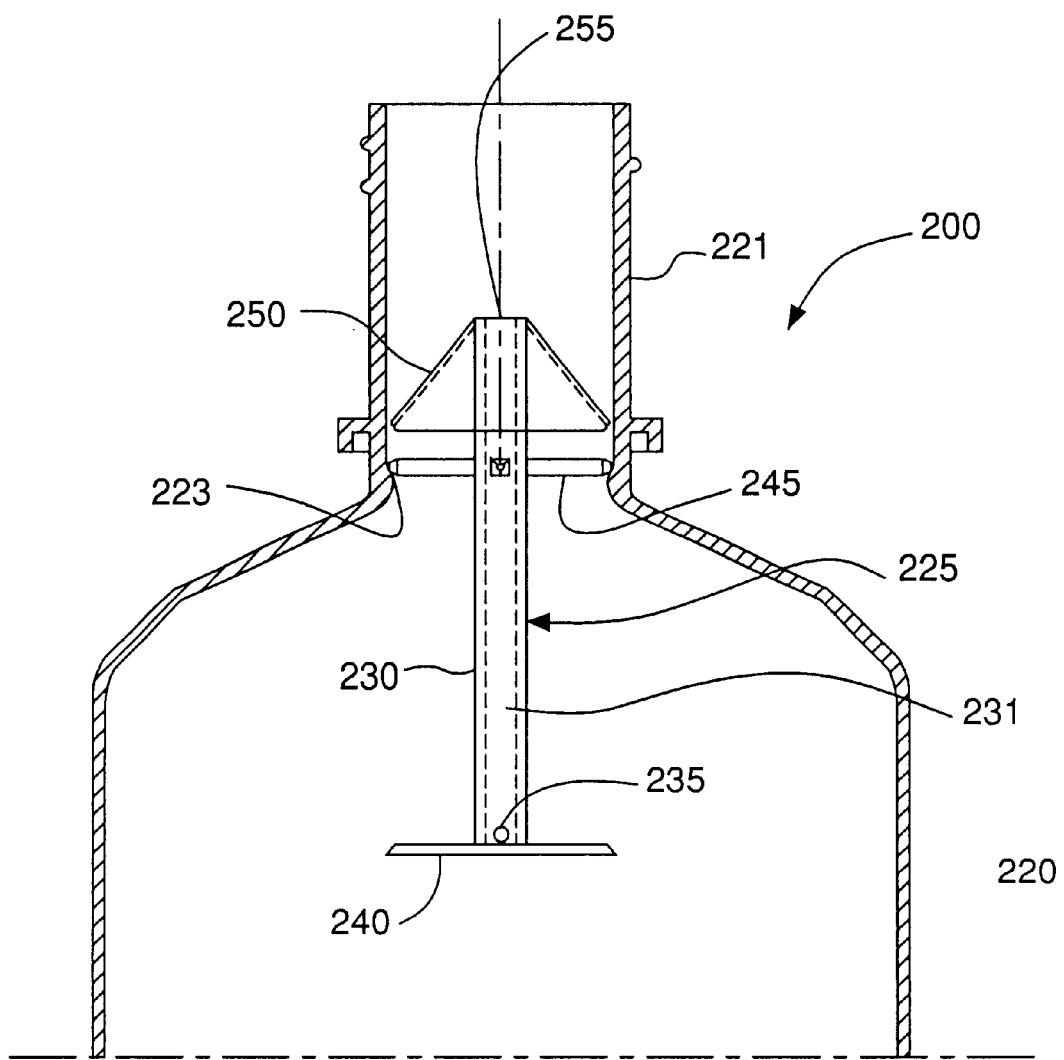
FIG. 12 is side elevation view of a liquid dispensing system according to a third exemplary embodiment of the present invention.

FIG. 12 shows a liquid dispensing system 200 according to a third exemplary embodiment of the present invention. The system 200 is substantially similar to the systems 10 and 100 shown in FIGS. 1–3 and 10–11, except that a second valve cap 250 is concave or cone-shaped. The concave shape of the second valve cap 250 assists in increasing the dosage amount obtained from the system 200.

The system 200 includes a container 220 with a valve device 225 disposed inside the container. The valve device 225 includes a shaft 230 which includes a hollow passage 231 on the interior thereof. A first valve cap 240 is coupled to a first end of the shaft 230, and a second valve cap 250 is coupled to a second end of the shaft. The first valve cap 240 is preferably made of a flexible material (e.g., flexible plastic) so that the valve device may be easily inserted into the container 220. The first valve cap 240 also preferably has a diameter at least twice the diameter of the shaft 230. This feature allows the valve device 225 to be utilized with containers (e.g. container 220) of different neck (e.g., neck 221) sizes while still allowing significant liquid flow. Additionally, the diameter of the first valve cap 240 is preferably made wider than the diameter of the container throat 223, so that once the valve device 225 has been inserted in the container 220, it cannot be removed without applying significant force to the valve device in an upwards direction. The second valve cap 250 preferably includes a central hole which is substantially aligned with the hollow passage in the shaft 230. The diameter of the second valve cap 250 is preferably less than the diameter of the container neck 221, so that the valve device 225 may move within the container neck. The valve device 225 also includes a spider guide 245 which is preferably approximately the same diameter as the container throat 223, so that an outer surface of the spider guide rests on the container throat when the container 220 is in its fully upright position. The spider guide 245 preferably comprises an X-shaped member which extends from shaft 230, however, the spider guide may take any suitable shape known to those skilled in the art. One of the benefits of the system 200 is that the valve device 225 can accommodate larger dosage volumes in containers with smaller necks (i.e., it allows the diameter of the first valve cap 240 to be made larger).

The liquid dispensing systems 10, 100, and 200 according to the first through third exemplary embodiments of the present invention provide for a more accurate and efficient method of dispensing liquid because of the improved venting system (i.e., shafts 30, 130, 230, inlet vent holes 55, 155, 255, outlet vent holes 35, 135, 235) of the respective valve devices 25, 125, 225. The hollow passages 31, 131, 231 in the shafts 30, 130, 230 allow air to flow into the liquid at a controlled rate (as shown in FIGS. 6–9), thereby making the transition of the valve devices 25, 125, 225 much smoother and more accurate than in prior art dispensing systems (e.g., U.S. Pat. No. 5,044,027 described above).

The valve devices 25, 125, and 225 described above are preferably made of plastic by extrusion methods which are well known in the art. Preferably, the above-described shafts (e.g., 30, 130, 230), first caps (e.g., 40, 140, 240), second caps (e.g., 50, 150, 250) and the spider guides (e.g., 45, 145, 245) are formed as a unitary piece by extrusion. Further, it should be noted that the preferred dimensions (e.g., $d_1$, $d_2$, $d_3$, etc.) for the shaft, first cap, second cap and the spider guide described above with reference to the first exemplary embodiment apply equally to the second through third embodiments. Additionally, it should be noted that the shafts (e.g., 30, 130, 230) and hollow passages (e.g., 31, 131, 231) may be formed of any suitable diameters, and that such diameters may be altered to alter the amount of fluid dispensed and fluid flow rate.

Although the invention has been described in terms of exemplary embodiments, it is not limited thereto. Rather, the appended claims should be construed broadly, to include other variants and embodiments of the invention which may be made by those skilled in the art without departing from the scope and range of equivalents of the invention.

What is claimed is:

1. A dispensing device for insertion into a container for assisting in the dispensing of a liquid from the container, comprising:

a shaft having a substantially hollow passage therein;

a first cap disposed on a first end of the shaft;

a second cap disposed on a second end of the shaft, said second cap having an opening therein which is substantially aligned with the hollow passage, and said second cap being completely disposed within said container when said device is inserted therein; and, a spider guide disposed between the second cap and the shaft, wherein the shaft has at least one hole therein disposed at a position closer to the first end of the shaft than the second end of the shaft, and wherein the opening in the second cap allows air to flow into the hollow passage of the shaft and out of the at least one hole formed in the shaft.

2. The device of claim 1, wherein the second cap is made of a flexible material.

3. The device of claim 1, wherein the first cap comprises a disc-shaped member which has a diameter at least twice that of a diameter of the shaft.

4. The device of claim 1, wherein the second cap comprises a disc-shaped member which has a diameter at least twice that of a diameter of the shaft.

5. The device of claim 1, wherein the spider guide comprises an X-shaped member which extends from the shaft.

6. The device of claim 1, wherein the second cap is substantially cone-shaped.

7. The device of claim 1, wherein the at least one hole comprises at least two holes disposed on opposing sides of the shaft.

8. The device of claim 1, wherein the shaft, the first cap, the second cap and the spider guide are formed as a unitary piece by an extrusion process.

9. The device of claim 1, wherein the at least one hole extends through a wall of the shaft, from the hollow passage to an outer surface of the shaft.

10. The device of claim 1, wherein the at least one hole is substantially circular.

11. The device of claim 1, wherein the first cap is fixedly attached to the first end of the shaft.

12. The device of claim 1, wherein the diameter of the at least one hole is approximately one-third of the diameter of the opening.

13. A dispensing device for insertion into a container for assisting in the dispensing of liquid from the container, comprising:
- a shaft having a substantially hollow passage therein;
- a first cap disposed on a first end of the shaft, said first cap including at least one guide member extending therefrom;
- a second cap disposed on a second end of the shaft, said second cap having an opening therein which is substantially aligned with the hollow passage, and said second cap being completely disposed within said container when said dispensing device is inserted therein; and,
- wherein the shaft has at least one hole therein disposed at a position closer to the first end of the shaft than the second end of the shaft, and
- wherein the opening in the second cap allows air to flow into the hollow passage of the shaft and out of the at least one hole formed in the shaft.

14. The device of claim 13, wherein the at least one guide member comprises four guide members disposed at various positions around the periphery of the first cap and extending therefrom.

15. An apparatus for dispensing liquid comprising:
- a container; and,
- a device completely disposed within said container for assisting in the dispensing of liquid from the container comprising a shaft having a substantially hollow passage therein, a first cap disposed on a first end of the shaft, a second cap disposed on a second end of the shaft, said second cap having an opening therein which is substantially aligned with the hollow passage, and, a spider guide disposed between the second cap and the shaft, wherein the shaft has at least one hole therein disposed at a position closer to the first end of the shaft than the second end of the shaft, and wherein the opening in the second cap allows air to flow into the hollow passage of the shaft and out of the at least one hole formed in the shaft.

16. The apparatus of claim 15, wherein at least one portion of the spider guide rests on a throat of the container when the device is disposed within the container.

17. A method for forming a dispensing device, comprising the step of:
- forming a dispensing device as a unitary piece by an extrusion process, said dispensing device including a shaft having a substantially hollow passage therein, a first cap disposed on a first end of the shaft, a second cap disposed on a second end of the shaft, said second cap having an opening therein which is substantially aligned with the hollow passage and, a spider guide disposed between the second cap and the shaft, wherein the shaft has at least one hole therein disposed at a position closer to the first end of the shaft than the second end of the shaft.

18. A dispensing device for insertion into a container for assisting in the dispensing of a liquid from the container, comprising:
- a shaft having a substantially hollow passage therein;
- a first cap disposed on a first end of the shaft;
- a second cap disposed on a second end of the shaft, said second cap having an opening therein which is substantially aligned with the hollow passage, and said first cap extending substantially to the container when inserted therein, but not all the way to the container, such that a clearance exists between a perimeter of said second cap and said container; and,
- a spider guide disposed between the second cap and the shaft,
- wherein the shaft has at least one hole therein disposed at a position closer to the first end of the shaft than the second end of the shaft, and wherein the opening in the second cap allows air to flow into the hollow passage of the shaft and out of the at least one hole formed in the shaft.

* * * * *